United States Patent
Jung et al.

(10) Patent No.: US 8,060,016 B2
(45) Date of Patent: Nov. 15, 2011

(54) WIRELESS COMMUNICATION METHOD, AND WIRELESS COMMUNICATION APPARATUS AND WIRELESS COMMUNICATION SYSTEM USING THE SAME

(75) Inventors: Do-sung Jung, Seoul (KR); Tae-don Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 12/345,836

(22) Filed: Dec. 30, 2008

(65) Prior Publication Data

US 2010/0009629 A1 Jan. 14, 2010

(30) Foreign Application Priority Data

Jul. 10, 2008 (KR) ........................ 10-2008-0066980

(51) Int. Cl.
*H04B 7/00* (2006.01)

(52) U.S. Cl. ..................................................... 455/41.2
(58) Field of Classification Search .................... 455/39, 455/41.2, 41.3, 68, 69, 70, 500, 515
See application file for complete search history.

(56) References Cited

U.S. PATENT DOCUMENTS

| | | | |
|---|---|---|---|
| 6,961,541 B2 * | 11/2005 | Overy et al. ................. | 455/41.2 |
| 7,305,511 B2 * | 12/2007 | Barrett et al. ................. | 710/316 |
| 7,486,183 B2 * | 2/2009 | Luebke et al. ................. | 340/506 |
| 7,953,400 B2 * | 5/2011 | Lee et al. ...................... | 455/418 |

* cited by examiner

*Primary Examiner* — Jeffrey Zweizig
(74) *Attorney, Agent, or Firm* — Sughrue Mion, PLLC

(57) ABSTRACT

A wireless communication method, and a wireless communication apparatus and wireless communication system using the same. The wireless communication method includes pairing with a specific device, extracting a media access control (MAC) address of the specific device, and communicating with the specific device. Accordingly, even when a MAC address of a counterpart device is not known, pairing with the counterpart device can be performed without interference with other devices.

21 Claims, 12 Drawing Sheets

WIRELESS COMMUNICATION METHOD, AND WIRELESS COMMUNICATION APPARATUS AND WIRELESS COMMUNICATION SYSTEM USING THE SAME

CROSS-REFERENCE TO RELATED APPLICATIONS

This application claims priority from Korean Patent Application No. 10-2008-0066980, filed on Jul. 10, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to wireless communication, and more particularly, to wireless communication by which communication between devices is performed using a media access control (MAC) address.

2. Description of the Related Art

In general, a wireless communications environment provides greater convenience than a wired communications environment, since in a wireless communications environment installation and movement are easy and spatial restrictions are small. Devices used for wireless communication have a media access control (MAC) address which is a unique physical address, through which data can be transmitted.

A MAC address consists of a manufacturer code of 3 bytes and a serial code of 3 bytes, and is assigned to each device. That is, all devices may be distinguished by the manufacturer code and serial code of their MAC addresses.

Wireless communication apparatuses need to be paired with counterpart devices in order to carry out communications.

In the related art, in order to pair a wireless communication apparatus with a counterpart device, a method of physically inputting a MAC address of a counterpart device to a memory using an input device was used. However, such a method requires various processes for pairing between devices, and general users who do not use the input device cannot perform pairing.

In addition, if pairing is performed wirelessly, a pairing request signal and a pairing approval signal are broadcast to neighboring devices since a MAC address of a counterpart device is not known, so interference with neighboring devices may lead to malfunctioning.

Therefore, there is a need for methods for wireless communication with a counterpart device even when a MAC address of the counterpart device is not known.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a wireless communication method by which pairing with a counterpart device enables wireless communication even when a media access control (MAC) address of the counterpart device is not known, and a wireless communication apparatus and wireless communication system using the same.

According to an exemplary aspect of the present invention, there is provided a wireless communication method of a device, the method including pairing with a counterpart device by transmitting a unique address of the device to the counterpart device using a shared address and by receiving a unique address of the counterpart device from the counterpart device, and communicating with the counterpart device using at least one of the unique address of the device and the unique address of the counterpart device.

The pairing operation may include transmitting a request for pairing to the counterpart device, and receiving approval for pairing from the counterpart device.

In the request operation, pairing with the counterpart device may be requested by wirelessly transmitting a message including a password to the counterpart device using the shared address.

The pairing operation may include receiving a request for pairing from the counterpart device, and transmitting approval for pairing to the counterpart device.

In the approval operation, pairing with the counterpart device may be approved by wirelessly transmitting a message including a password to the counterpart device using the shared address.

There may be a plurality of shared addresses, and in the pairing operation, the device may be paired with the counterpart device by setting one of the shared addresses to be an address for transmission and setting another one of the shared addresses to be an address for reception.

There may be a plurality of counterpart devices, and in the pairing operation, the device may be paired with the counterpart devices by receiving unique addresses of the plurality of counterpart devices.

In the pairing operation, if pairing is initially performed, the device may be paired with the counterpart device by wirelessly transmitting a message including a password input by a user to the counterpart device.

In the pairing operation, if pairing is not initially performed, the device may be paired with the counterpart device by wirelessly transmitting a message including a pre-stored password to the counterpart device.

According to another exemplary aspect of the present invention, there is provided a wireless communication apparatus, including a storage unit which stores a shared address, a transmission/reception unit which is paired with a counterpart device by transmitting a unique address of the wireless communication apparatus to the counterpart device using a shared address and by receiving a unique address of the counterpart device from the counterpart device, and a control unit which communicates with the counterpart device using at least one of the unique address of the wireless communication apparatus and the unique address of the counterpart device.

The transmission/reception unit may transmit a request for pairing to the counterpart device, and receive approval for pairing from the counterpart device.

The transmission/reception unit may request pairing with the counterpart device by wirelessly transmitting a message including a password to the counterpart device using the shared address.

The transmission/reception unit may receive a request for pairing from the counterpart device, and transmit approval for pairing to the counterpart device.

The transmission/reception unit may approve pairing with the counterpart device by wirelessly transmitting a message including a password to the counterpart device using the shared address.

There may be a plurality of shared addresses, and the transmission/reception unit may be paired with the counterpart device by setting one of the shared addresses to be an address for transmission and setting another one of the shared addresses to be an address for reception.

There may be a plurality of counterpart devices, and the transmission/reception unit may be paired with the counterpart devices by receiving unique addresses of the plurality of counterpart devices.

If pairing is initially performed, the transmission/reception unit may be paired with the counterpart device by wirelessly transmitting a message including a password input by a user to the counterpart device.

If pairing is not initially performed, the transmission/reception unit may be paired with the counterpart device by wirelessly transmitting a message including a pre-stored password to the counterpart device.

According to another exemplary aspect of the present invention, there is provided a wireless communication system, including a first device which transmits pairing request data including a password using a shared address, and a second device which receives the pairing request data, and if the received password is the same as a stored password, transmits pairing approval data including the password using the shared address.

According to another exemplary aspect of the present invention, there is provided a wireless communication system, including a first device which wirelessly transmits pairing request data and first pairing data using a shared address, and a second device which wirelessly transmits pairing approval data and second pairing data using the shared address based on information included in the pairing request data and the first pairing data.

According to another exemplary aspect of the present invention, there is provided a wireless communication system, including a first device which performs pairing by wirelessly transmitting data including a password and a first media access control (MAC) address using a shared address, and a second device which performs pairing by wirelessly transmitting data including the password and a second MAC address using the shared address.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
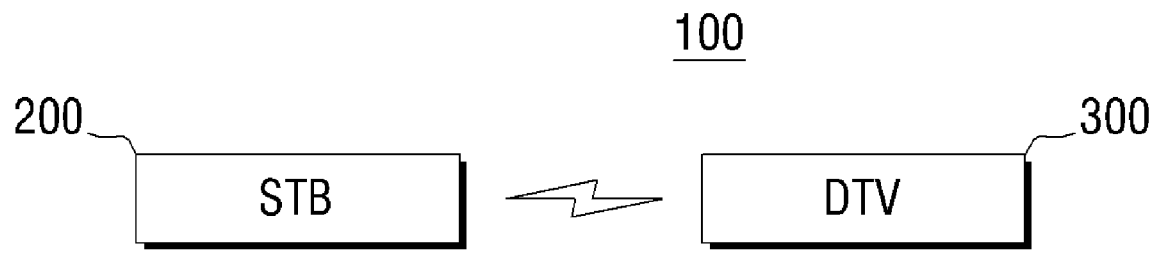
FIG. 1 is a schematic block diagram of a wireless communication system according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in excessive detail since they would obscure the invention with unnecessary detail.

FIG. 1 is a schematic block diagram of a wireless communication system 100 according to an exemplary embodiment of the present invention. The wireless communication system 100 provides a user with broadcasts received from a broadcasting station, so the user can view the broadcasts. As illustrated in FIG. 1, the wireless communication system 100 includes a set-top box (STB) 200 and a digital television (DTV) 300.

The STB 200 is a type of broadcast reception apparatus which receives broadcasts from broadcasting stations wirelessly or via a cable. The STB 200 tunes to a broadcast of a broadcasting station, demodulates and decodes the broadcast, and transmits the broadcast to the DTV 300 wirelessly.

The DTV 300 is a type of broadcast output apparatus which outputs a broadcast wirelessly transmitted from the STB 200. The DTV 300 processes the broadcast so that images and sounds can be provided to the user.

Figure 2:
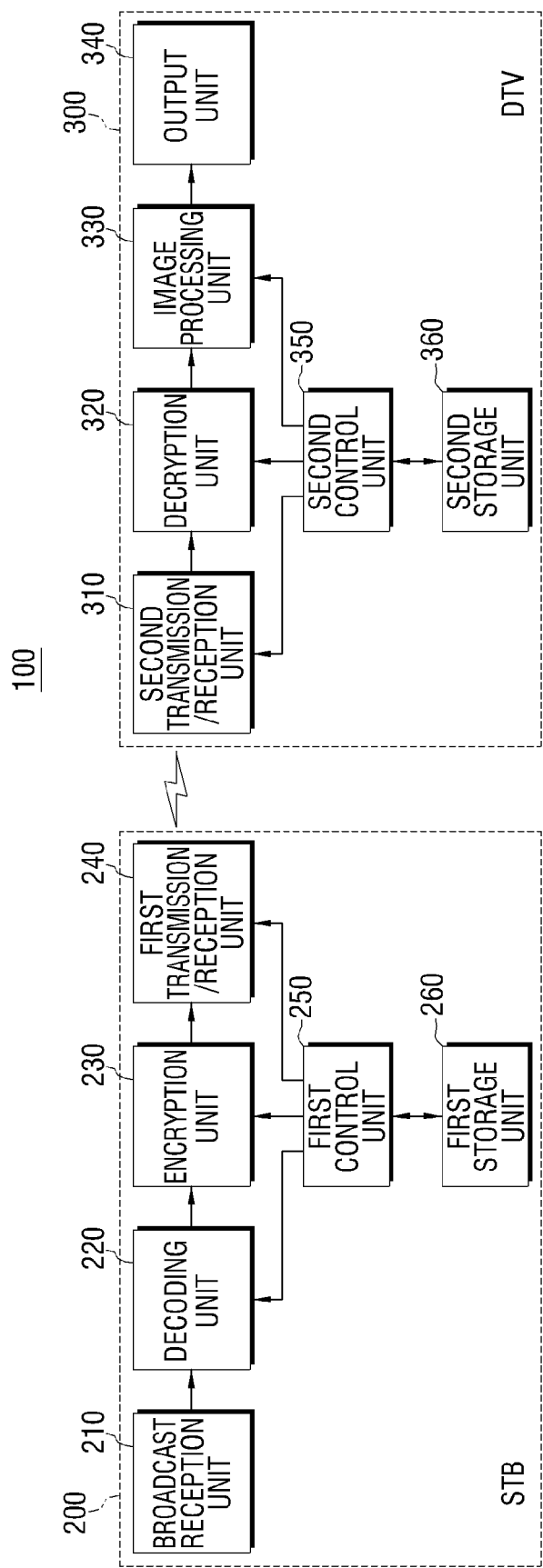
FIG. 2 is a detailed block diagram of a wireless communication system according to an exemplary embodiment of the present invention.

FIG. 2 is a detailed block diagram of the wireless communication system 100 according to an exemplary embodiment of the present invention.

As illustrated in FIG. 2, the STB 200 includes a broadcast reception unit 210, a decoding unit 220, an encryption unit 230, a first transmission/reception (transceiving) unit 240, a first control unit 250, and a first storage unit 260.

The broadcast reception unit 210 tunes to one of broadcasts received wirelessly or through a cable, demodulates the tuned broadcast, and outputs the demodulated broadcast to the decoding unit 220.

The decoding unit 220 decodes the demodulated broadcast signal, and outputs the decompressed broadcast signal to the encryption unit 230.

The encryption unit 230 encrypts the decoded broadcast signal in order to prevent illegal copying of a broadcast which may occur while transmitting the broadcast to the DTV 300.

When a broadcast is transmitted from the STB 200 to the DTV 300, a user having no permitted viewing rights or a third party may intercept and view the broadcast. In order to prevent such a risk, the encryption unit 230 encrypts the decoded broadcast, and transmits the encrypted broadcast to the first transmission/reception unit 240. The operation of the encryption unit 230 is controlled by the first control unit 250.

The first transmission/reception unit 240 transmits and receives messages for pairing between the STB 200 and the DTV 300, and wirelessly transmits the encrypted broadcast to the DTV 300 if pairing between the STB 200 and the DTV 300 is completed.

In general, wireless communications devices go through a pairing process of searching for neighboring devices and approving communications by authentication with the searched neighboring devices, and subsequently enter into a communication process.

Therefore, the first transmission/reception unit 240 transmits a pairing request message, a pairing approval message, and pairing messages to a second transmission/reception unit 310 of the DTV 300 and receives messages from the second transmission/reception unit 310, so the STB 200 can be paired with the DTV 300. If pairing is completed, the first transmission/reception unit 240 wirelessly transmits a broadcast encrypted by the encryption unit 230 to the DTV 300.

The first storage unit 260 stores shared media access control (MAC) addresses (referred to hereinafter as "shared addresses"), unique MAC addresses (referred to hereinafter as "unique addresses"), and passwords.

The shared address is a MAC address which is shared between particular devices, consisting of two addresses: a first shared address and a second shared address. For example, if manufacturer A stores a first shared address and a second shared address in all of the devices manufactured by manufacturer A, all of the devices manufactured by manufacturer A share the first shared address and the second shared address.

Accordingly, all of the devices manufactured by manufacturer A can perform pairing and communication using the first shared address and the second shared address. That is, communication between all of the devices manufactured by manufacturer A is enabled by setting the first shared address and the second shared address to be a source address and a destination address.

The unique address is a unique physical address of a device. The first storage unit 260 stores a unique physical address of the STB 200. In addition, if a unique address of the DTV 300 is obtained during the pairing process, the first storage unit 260 stores the acquired unique address of the DTV 300.

Such an operation of the first storage unit 260 is controlled by the first control unit 250.

The first control unit 250 controls the overall operation of the STB 200. In particular, the first control unit 250 controls the first transmission/reception unit 240 to be paired with the DTV 300 so that a broadcast can be wirelessly transmitted to the DTV 300. If pairing is completed, the first control unit 250 controls the first transmission/reception unit 240 to wirelessly transmit a broadcast to the DTV 300.

The first control unit 250 controls the first storage unit 260 to store a password input by the user and store a unique address of the DTV 300 received from the DTV 300 through the first transmission/reception unit 240.

The DTV 300 is a type of broadcast output apparatus which outputs a broadcast wirelessly transmitted from the STB 200. The DTV 300 processes the broadcast so that images and sounds can be provided to the user.

As illustrated in FIG. 2, the DTV 300 according to an exemplary embodiment of the present invention includes a second transmission/reception unit 310, a decryption unit 320, an image processing unit 330, an output unit 340, a second control unit 350, and a second storage unit 360.

The second transmission/reception unit 310 transmits messages for pairing between the STB 200 and the DTV 300 to the first transmission/reception unit 240, and receives messages from the first transmission/reception unit 240 according to the control of the second control unit 350. In greater detail, the second transmission/reception unit 310 transmits a pairing request message, a pairing approval message, and pairing messages to the first transmission/reception unit 240 of the STB 200, and receives messages from the first transmission/reception unit 240, so the STB 200 can be paired with the DTV 300.

If pairing between the STB 200 and the DTV 300 is completed, the second transmission/reception unit 310 receives a broadcast from the first second transmission/reception unit 240 and transmits the broadcast to the decryption unit 320.

The decryption unit 320 decrypts the encrypted broadcast, and transmits the decrypted broadcast to the image processing unit 330. Such an operation of the decryption unit 320 is controlled by the second control unit 350.

The image processing unit 330 performs image signal processing of the decrypted broadcast such as color signal processing and image quality improvement according to control of the second control unit 350. The image processing unit 330 transmits the processed broadcast to the output unit 340, and the output unit 340 displays images on a display.

The second storage unit 360 stores a shared address, a unique address, and a password. The unique address is a unique physical address of the DTV 300.

In addition, the second storage unit 360 stores a unique address of the STB 200 if the unique address of the STB 200 is obtained by pairing operation.

Such operation of the second storage unit 360 is controlled by the second control unit 350.

The second control unit 350 controls the overall operation of the DTV 300. In particular, the second control unit 350 controls the second transmission/reception unit 310 to pair the DTV 300 with the STB 200. If pairing is completed, the second control unit 350 controls the second transmission/reception unit 310 to receive a broadcast from the first transmission/reception unit 240.

The second control unit 350 controls the second storage unit 360 to store a password input by the user and store a unique address of the STB 200 wirelessly received from the STB 200 through the second transmission/reception unit 310.

Figure 3:
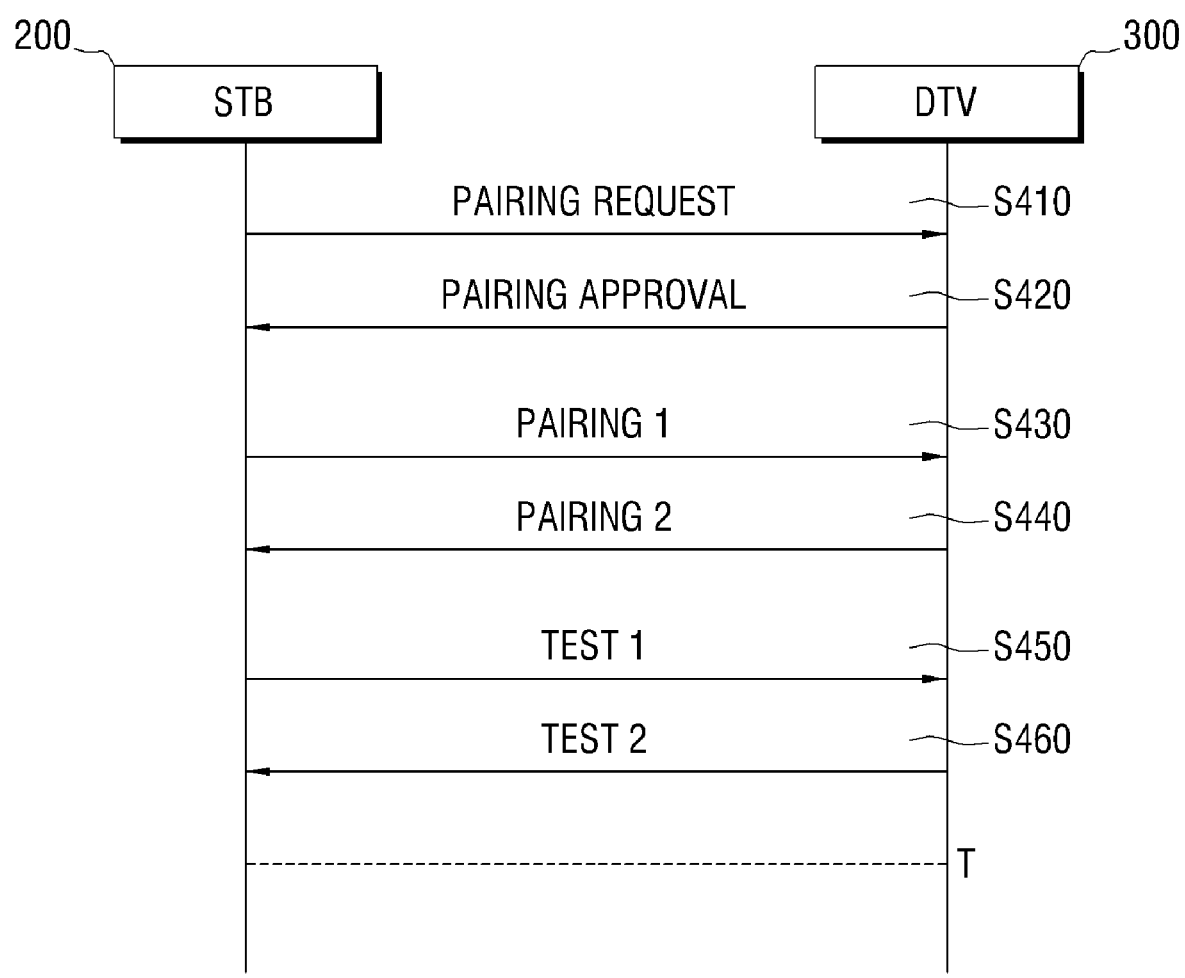
FIG. 3 illustrates a pairing process according to an exemplary embodiment of the present invention.

FIG. 3 illustrates a pairing process according to an exemplary embodiment of the present invention.

If a user inputs a command to pair the STB 200 with the DTV 300, the STB 200 transmits a pairing request to the DTV 300 (S410). For example, if the user inputs a pairing command using a button (not shown) provided on the STB 200, or a remote control (not shown) provided to manipulate the STB 200, the STB 200 transmits a pairing request message to the DTV 300.

The STB 200 may add a password to the pairing request message, and transmit the password-added pairing request message to the DTV 300.

If the DTV 300 receives the pairing request message from the STB 200, the DTV 300 determines if the pairing requested by the STB 200 is intended for the DTV 300 itself. If the pairing requested by the STB 200 is intended for the DTV 300 itself, the DTV 300 adds a password to a pairing approval message and transmits it to the STB 200 (S420).

The DTV 300 may determine if the pairing requested by the STB 200 is intended for the DTV 300 itself by identifying the password included in the pairing request message. In greater detail, the DTV 300 determines if the password included in the pairing request message is the same as a password stored in the second storage unit 360. If the password included in the pairing request message is the same as the password stored in the second storage unit 360, the DTV 300 recognizes that the pairing requested by the STB 200 is intended for the DTV 300 itself.

In addition, the STB 200 may determine if the pairing approved by the DTV 300 is intended for the pairing request of the STB 200 itself by identifying the password included in the pairing approval message. In greater detail, the STB 200 determines if the password included in the pairing approval message is the same as a password stored in the first storage unit 260. If the password included in the pairing approval message is the same as the password stored in the first storage unit 260, the STB 200 recognizes that the pairing approved by the DTV 300 is intended for the pairing request of the STB 200 itself As described above, if the DTV 300 transmits the pairing approval message to the STB 200, the STB 200 is paired with the DTV 300 (S430 and S440). More specifically, the STB 200 transmits a first pairing message including a first password to the DTV 300 (S430), and the DTV 300 transmits a second pairing message including a second password to the STB 200 (S440), so the STB 200 is paired with the DTV 300.

The STB 200 may add a unique MAC address of the STB 200 to the first pairing message and transmit it to the DTV 300. The DTV 300 may add a unique MAC address of the DTV 300 to the second pairing message and transmit it to the STB 200.

Subsequently, whether or not the pairing is completed is determined by test communication between the STB 200 and the DTV 300. In greater detail, whether or not the pairing is completed is determined by the STB 200 transmitting a first test message to the DTV 300, and by the DTV 300 transmitting a second test message to the STB 200.

In this case, a password may not be added to the first test message and the second test message. That is, unlike in the pairing request operation (S410), the pairing approval operation (S420), and the pairing operation (S430 and S440), since in the testing operation (S450 and S460), the unique MAC address of mutual counterparts is known, the STB 200 and the DTV 300 may designate a mutual counterpart using the unique MAC address of the mutual counterpart instead of a password, and transmit messages to each other.

Such test communication may be performed when pairing is completed within a predetermined time period T. That is, if pairing is not completed within a predetermined time period T, the STB 200 and the DTV 300 may suspend pairing and request pairing again or may stand by until a command to request pairing is newly input.

Figure 4:
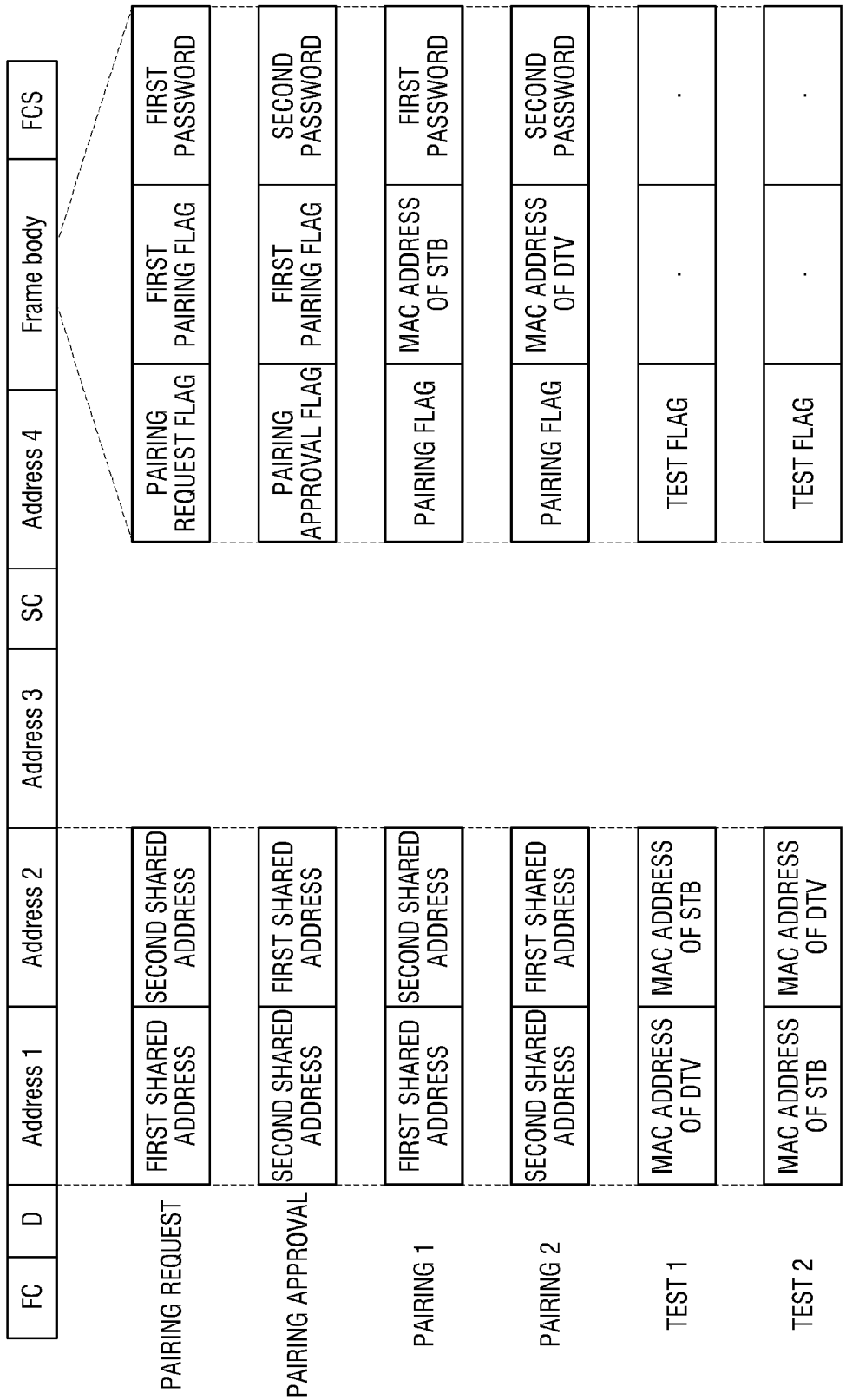
FIG. 4 illustrates a frame form of each message according to an exemplary embodiment of the present invention.

FIG. 4 illustrates a frame form of each message according to an exemplary embodiment of the present invention.

Referring to FIG. 4, a frame of a MAC layer is divided into nine fields. Frame control (FC) of two bytes represents a type of frame and control information. Duration (D) of two bytes represents a transmission time or identification (ID) of a frame.

The Addresses include four addresses: Address 1, Address 2, Address 3, and Address 4, each having six bytes. In particular, Address 1 represents a destination address, and Address 2 represents a source address.

A Sequence control (SC) of 2 bytes represents the order of a frame used for flow control. A Frame body of zero to 2312 bytes is used to transmit data. A Frame check sequence (FCS) of four bytes is used to control errors.

Hereinbelow, among frame forms of messages transmitted in the operations illustrated in FIG. 3, Address 1, Address 2, and the Frame body, which vary in each operation, are described.

In a frame form of a pairing request message, Address 1 represents a first shared address, and Address 2 represents a second shared address. As described above, the STB 200 and the DTV 300 each store the first shared address and the second shared address.

Accordingly, if the user inputs a command to pair the STB 200 with the DTV 300, the STB 200 sets one of the two addresses to be a source address, and sets the other address to be a destination address. The first shared address may be set as a source address, and the second shared address may be set as a destination address, and vice versa. In an exemplary embodiment, the former case is described as an example.

The Frame body includes a pairing request flag, a first pairing flag, and a first password.

The pairing request flag represents whether to request pairing. For example, if the pairing request flag is 0, it indicates that pairing is not requested, and if the pairing request flag is 1, it indicates that pairing is requested.

The first pairing flag indicates whether or not a current pairing request is a first pairing request. For example, if the first pairing flag is 0, this indicates a first pairing, and if the first pairing flag is 1, this indicates a non-first pairing.

As described above, the first password may be stored in the first storage unit 260 of the STB 200 or input by the user, and is an identifier to specify a counterpart with which the STB 200 is paired, that is, the DTV 300.

If the first password is stored in the first storage unit 260, the stored first password is added to the pairing request message. If the first password is not stored in the first storage unit 260, the first password is input by the user and added to the pairing request message.

If the first password is input by the user, the first password is stored in the first storage unit 260 in order to eliminate the inconvenience of the user inputting the first password again.

Since the password is added and transmitted, the STB 200 can specify a counterpart, with which the STB 200 is paired, as the DTV 300. That is, even when neighboring devices including the DTV 300 use shared addresses, the STB 200 can request pairing with the DTV 300 by specifying the DTV 300 using the password.

In a frame form of a pairing approval message, Address 1 represents the second shared address, and Address 2 represents the first shared address. As described above, the STB 200 and the DTV 300 each store the first shared address and the second shared address.

In the pairing request message received from the STB 200, since the first shared address is designated as a shared address of the DTV 300 and transmitted, the DTV 300 sets the first shared address as a source address, and sets the second shared address as a destination address.

Of course, if the pairing request message is received by designating the second shared address as a shared address of the DTV 300, the DTV 300 sets the second shared address as a source address, and sets the first shared address as a destination address.

The Frame body includes a pairing approval flag, a first pairing flag, and a second password.

The pairing approval flag indicates whether pairing is approved or not. For example, if the pairing approval flag is 0, it indicates that pairing is not approved, and if the pairing approval flag is 1, it indicates that pairing is approved.

Pairing is not approved when approval conditions set by the DTV 300 are not satisfied, for example, if the first password transmitted from the STB 200 is not the same as the second password stored in the DTV 300.

The first pairing flag is the same as that included in the pairing request message.

As described above, the second password may be stored in the second storage unit 360 of the DTV 300 or input by the user, and is an identifier to specify a counterpart with which the DTV 300 has approval to be paired, that is, the STV 200. If the second password is stored in the second storage unit 360, the stored second password is added to the pairing approval message. If the second password is not stored in the second storage unit 360, the second password is input by the user and added to the pairing approval message. If the second password is input by the user, the second password is stored in the second storage unit 360 in order to eliminate the inconvenience of the user inputting the second password again.

Since the password is added and transmitted, the DTV 300 can specify a counterpart, with which the DTV 300 approves to be paired, as the STB 200. That is, even when neighboring devices including the STB 200 use shared addresses, the DTV 300 can approve pairing with the STB 200 by specifying the STB 200 using the password.

In a frame form of a first pairing message, Address 1 represents the first shared address, and Address 2 represents the second shared address. Detailed description thereof is not repeated here since description was previously made in regards to the frame form of the pairing request message.

The Frame body includes a pairing flag, a unique MAC address of the STB 200, and a first password.

The pairing flag indicates whether the pairing operation is to be performed. For example, if the pairing flag is 0, the pairing operation is not performed, and if the pairing flag is 1, the pairing operation is performed.

In addition, the STB 200 adds the unique address of the STB 200 to the Frame body.

Since description of the first password was given above with regard to the frame form of the pairing request message, it is not repeated here. The first password included in the pairing request message may be input by the user, but the first password included in the pairing message is the password which is stored in the first storage unit 260, since the first password input by the user in the pairing request operation is stored in the first storage unit 260.

In a frame form of a second pairing message, Address 1 represents the second shared address, Address 2 represents the first shared address, and the Frame body includes a unique MAC address of the DTV 300, unlike the frame form of the first pairing message. However, detailed description thereof is not repeated here since inference can be made from the frame form of the first pairing message.

The DTV 300 receives the first pairing message from the STB 200, and stores the unique address of the STB 200 included in the first pairing message in the second storage unit 360. The STB 200 receives the second pairing message from the DTV 300, and stores the unique address of the DTV 300 included in the second pairing message in the first storage unit 260.

If the first pairing message and the second pairing message are exchanged, pairing between the STB 200 and the DTV 300 is completed, so the STB 200 and the DTV 300 store a mutual counterpart's unique address.

In a frame form of a first test message, Address 1 represents the unique address of the DTV 300, and Address 2 represents the unique address of the STB 200. Since the STB 200 stores the unique address of the STB 200 and the unique address of the DTV 300 in the first storage unit 260, the shared addresses and the password do not need to be used in the test operation.

Accordingly, the STB 200 designates the unique address of the DTV 300 as a source address, and designates the unique address of the STB 200 as a destination address.

The Frame body includes a test flag. The test flag indicates whether a test operation is performed. For example, if the test flag is 0, the test operation is not performed, and if the test flag is 1, the test operation is performed.

Since a frame form of a second test message can be inferred from the frame form of the first test message, description thereof is not repeated here.

Figure 5:
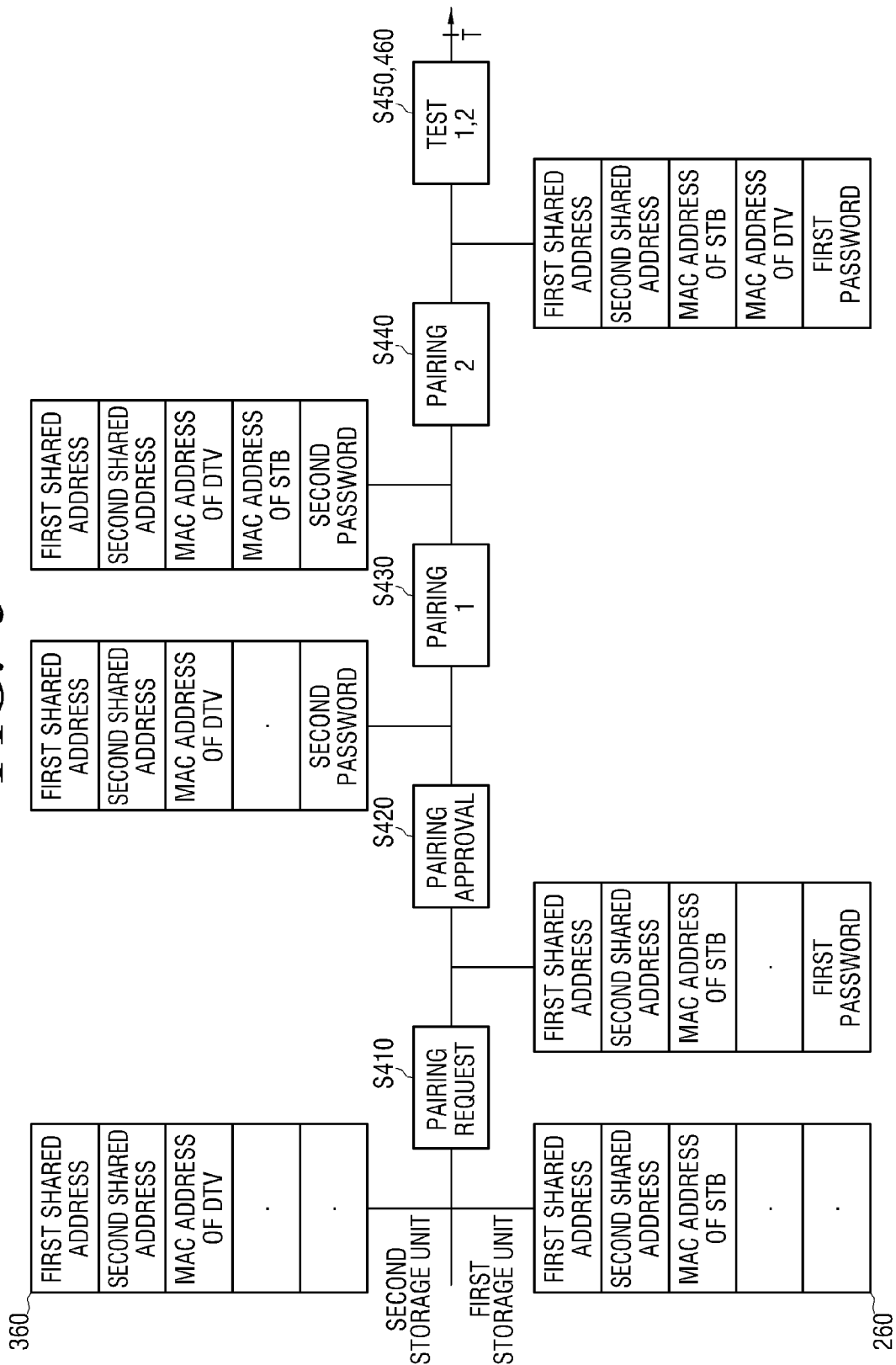
FIG. 5 illustrates data stored in a first storage unit and a second storage unit.

FIG. 5 illustrates data stored in the first storage unit 260 and the second storage unit 360. In FIG. 5, data stored in the first storage unit 260 and the second storage unit 360 are shown according to points in time S410-S460 within a predetermined time period T.

Before requesting pairing (-S410), the first storage unit 260 stores the first shared address, the second shared address, and the unique address of the STB 200, and the second storage unit 360 stores the first shared address, the second shared address, and the unique address of the DTV 300.

In order to request and approve pairing, the STB 200 and the DTV 300 use a pre-stored password or a password input by the user as described above. For convenience of description, it is assumed that there is no pre-stored password and that a password is input by the user.

In order to request pairing, the STB 200 adds a first password input by the user to the Frame body, and transmits a pairing request message to the DTV 300. After pairing is requested (S410-S420), the first storage unit 260 further stores the first password as well as the first shared address, the second shared address, and the unique address of the STB 200.

In order to approve pairing, the DTV 300 adds a second password input by the user to the Frame body, and transmits a pairing approval message to the STB 200. After pairing is approved (S420-S430), the second storage unit 360 further stores the second password as well as the first shared address, the second shared address, and the unique address of the DTV 300.

The STB 200 adds the unique address of the STB 200 to the Frame body, and transmits a first pairing message to the DTV 300. After pairing is completed (S430-S440), the second storage unit 360 further stores the unique address of the STB 200 as well as the first shared address, the second shared address, the unique address of the DTV 300, and the second password.

The DTV 300 adds the unique address of the DTV 300 to the Frame body, and transmits a second pairing message to the STB 200. After pairing is completed (S440-S460), the first storage unit 260 further stores the unique address of the DTV 300 as well as the first shared address, the second shared address, the unique address of the STB 200, and the first password.

In an exemplary embodiment, a case in which pairing is completed within the predetermined time period T is described. If pairing is not completed within the predetermined time period T, the STB 200 and the DTV 300 may suspend pairing, delete the data stored after the pairing request operation, and request pairing again, or may wait until a command to request pairing is newly input.

Therefore, if pairing is not completed within the predetermined time period T, the first shared address, the second shared address, and the MAC address of the STB 200 remain in the first storage unit 260, and the first shared address, the second shared address, and the MAC address of the DTV 300 remain in the second storage unit 360.

Figure 6:
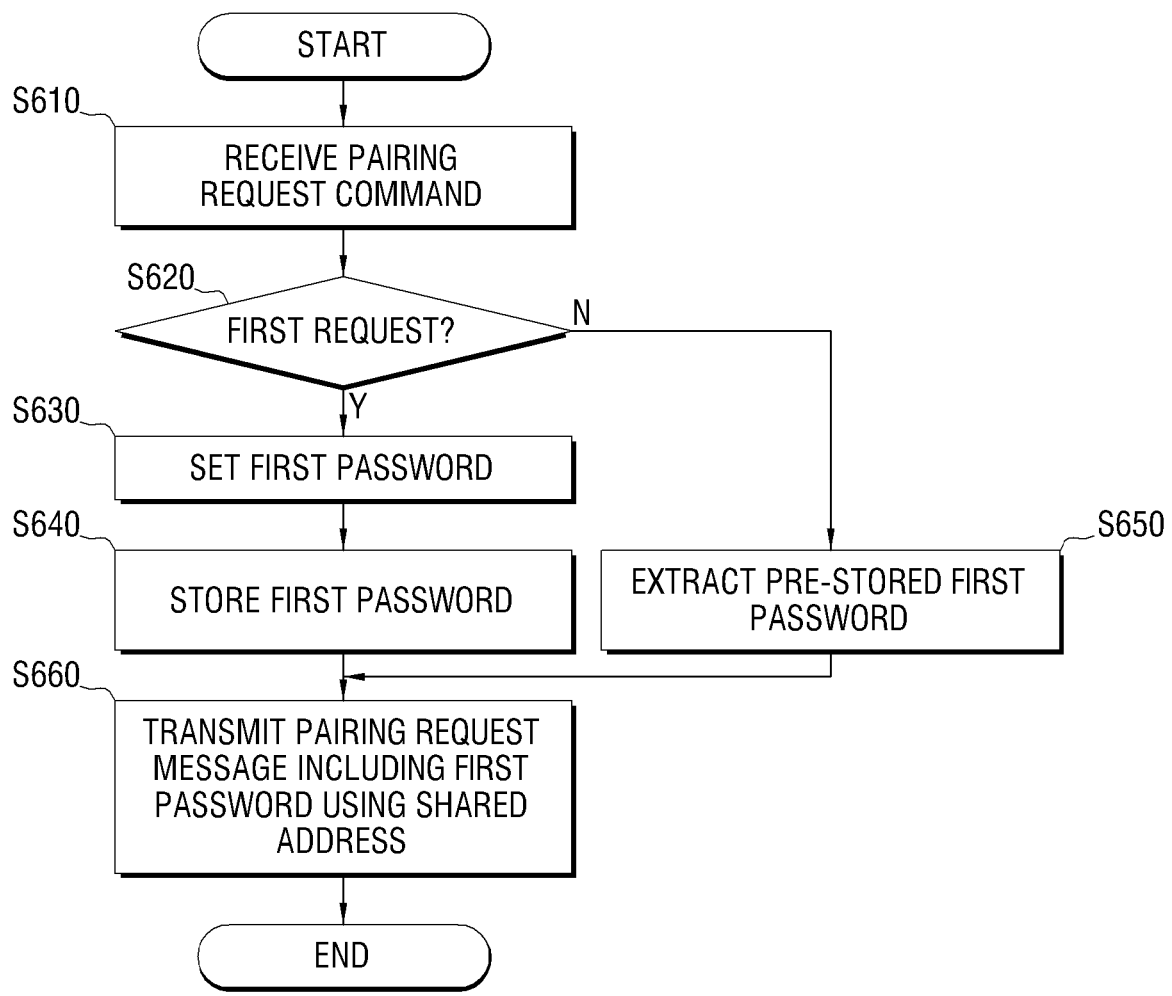
FIG. 6 is a flow chart illustrating a pairing request process of a set-top box according to an exemplary embodiment of the present invention.

FIG. 6 is a flow chart illustrating a pairing request process of the STB 200 according to an exemplary embodiment of the present invention.

If the user inputs a pairing request command (S610), the first control unit 250 determines if the pairing request command is a first pairing request command (S620).

If the pairing request command is a first pairing request command (S620-Y), the STB 200 receives a first password from the user (S630) and stores the first password in the first storage unit 260 (S640).

If the pairing request command is not a first pairing request command (S620-N), the STB 200 extracts a pre-stored first password from the first storage unit 260 (S650).

Subsequently, the first control unit 250 controls the first transmission/reception unit 240 to wirelessly transmit a pairing request message including the first password using shared addresses (S660).

Accordingly, even when a unique address of a counterpart device is not known, the STB 200 can request pairing using the shared addresses and the password.

Figure 7:
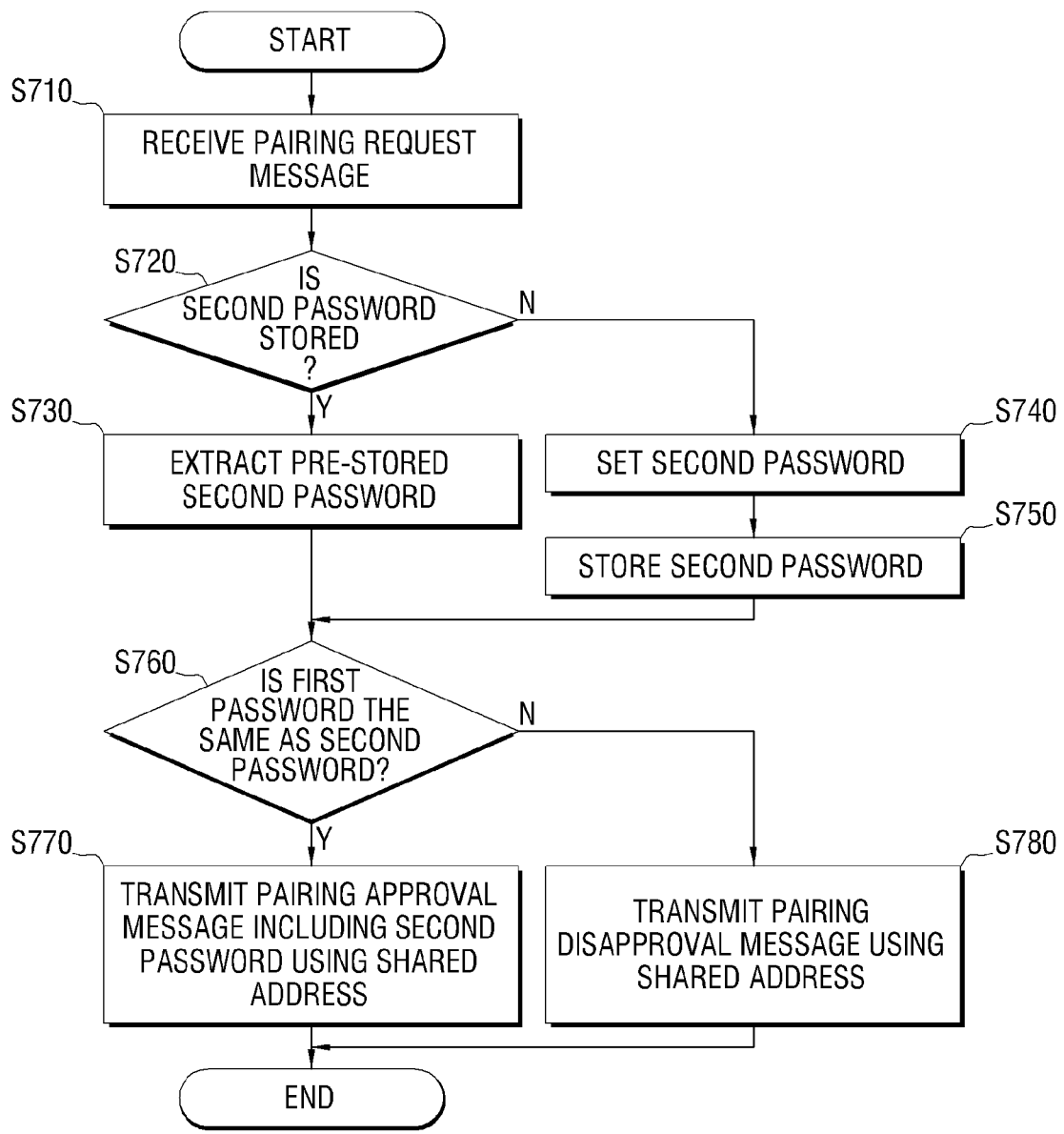
FIG. 7 is a flow chart illustrating a pairing approval process of a digital television according to an exemplary embodiment of the present invention.

FIG. 7 is a flow chart illustrating a pairing approval process of the DTV 300 according to an exemplary embodiment of the present invention.

If the second transmission/reception unit 310 receives a pairing request message (S710), the second control unit 350 determines if a second password is stored in the second storage unit 360 (S720).

If the second password is stored in the second storage unit 360 (S720-Y), the second control unit 350 extracts the pre-stored second password from the second storage unit 360 (S730).

If the second password is not stored in the second storage unit 360 (S720-N), the DTV 300 receives the second password from the user (S740), and stores the second password in the second storage unit 360 (S750).

Subsequently, the second storage unit 360 determines if the first password in the received pairing request message is the same as the second password which is set by the user or pre-stored (S760).

If the first password is the same as the second password (S760-Y), the second control unit 350 recognizes that the pairing request is intended for the DTV 300, and wirelessly transmits a pairing approval message including the second password using the shared addresses (S770).

If the first password is not the same as the second password (S760-N), the second control unit 350 recognizes that the pairing request is not intended for the DTV 300, and wirelessly transmits a pairing disapproval message including the second password using the shared addresses (S780).

Alternatively, if the second control unit 350 recognizes that the pairing request is not intended for the DTV 300, it is possible not to transmit any messages instead of wirelessly transmitting the pairing disapproval message.

In addition, it is also possible to transmit a pairing disapproval message not including the second password.

Accordingly, even when a unique address of a counterpart device is not known, pairing can be approved using the shared addresses and the password.

Figure 8:
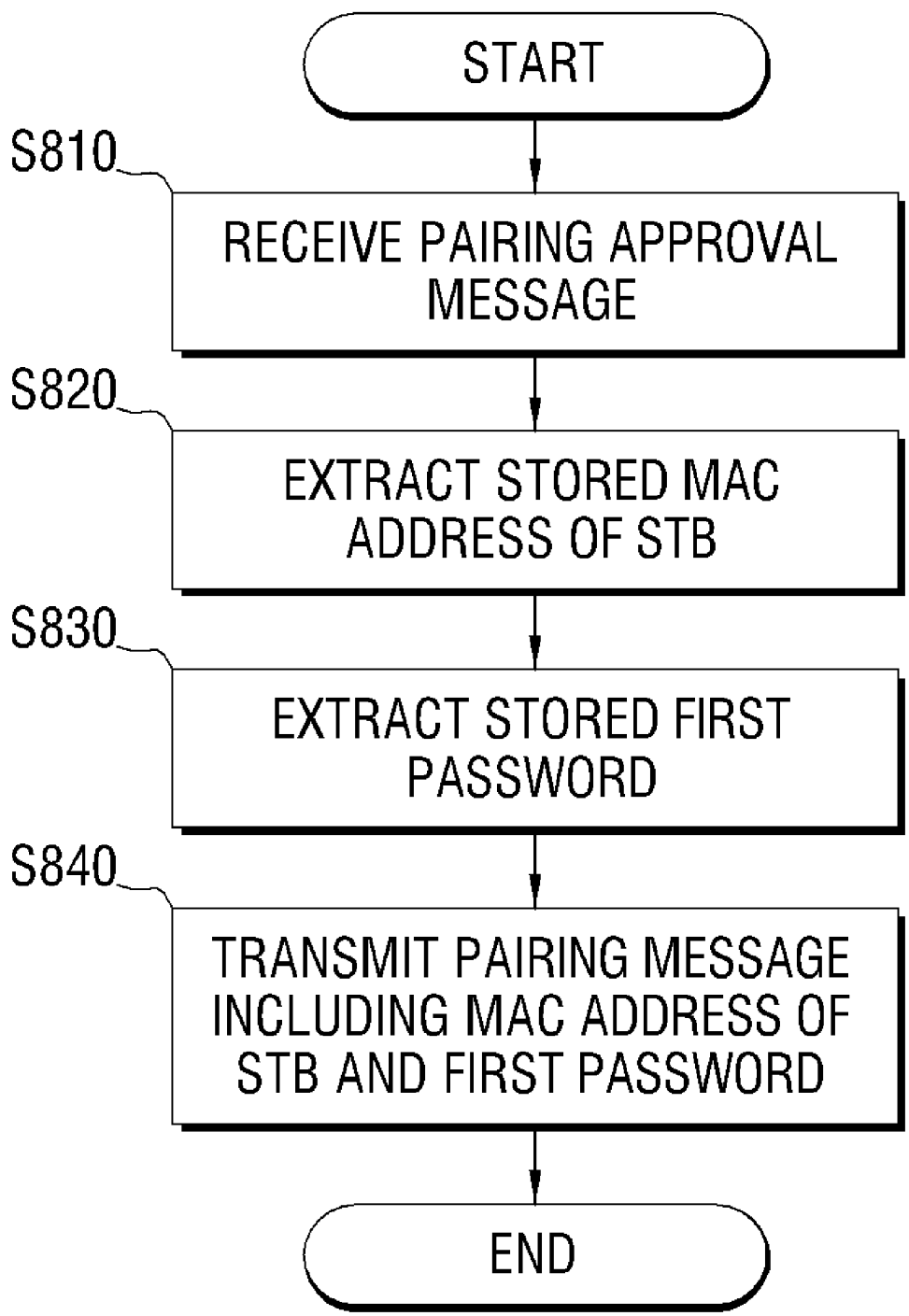
FIG. 8 is a flow chart illustrating a pairing process of a set-top box according to an exemplary embodiment of the present invention.
Figure 9:
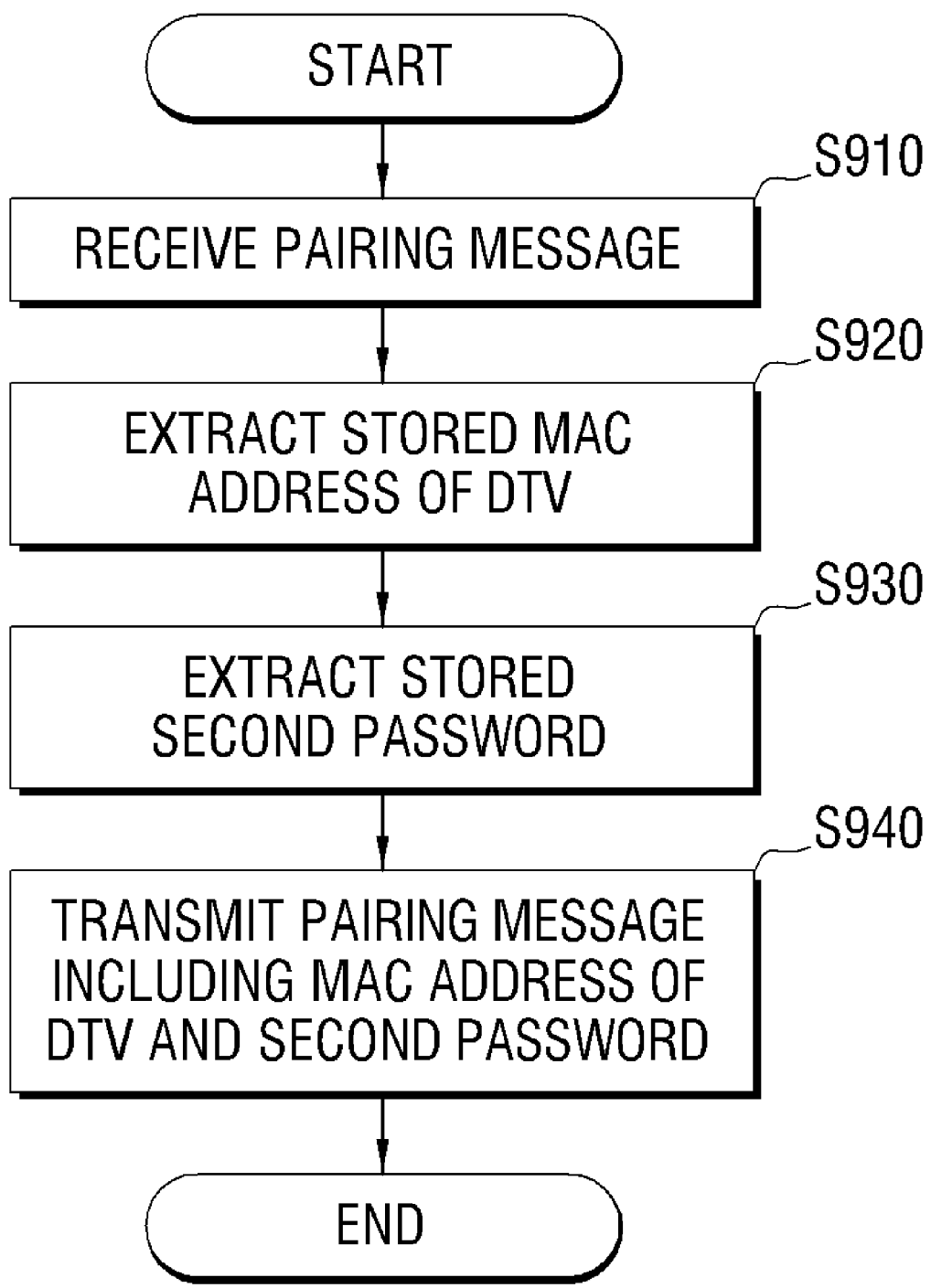
FIG. 9 is a flow chart illustrating a pairing process of a digital television according to an exemplary embodiment of the present invention

FIGS. 8 and 9 are flow charts illustrating a pairing process of the STB 200 and the DTV 300 according to an exemplary embodiment of the present invention. In more detail, FIG. 8 illustrates a pairing process of the STB 200 by transmitting a first pairing message, and FIG. 9 illustrates a pairing process of the DTV 300 by transmitting a second pairing message.

Referring to FIG. 8, if the STB 200 receives a pairing approval message from the DTV 300 (S810), the first control unit 250 extracts a unique address of the STB 200 from the first storage unit 260 (S820).

In addition, the first control unit 250 extracts a first password from the first storage unit 260 (S830).

Subsequently, the first control unit 250 controls the first transmission/reception unit 240 to transmit a first pairing message including the unique address of the STB 200 and the first password to the DTV 300 (S840).

Next, referring to FIG. 9, if the DTV 300 receives the first pairing approval message from the STB 200 (S910), the second control unit 350 extracts a unique address of the DTV 300 from the second storage unit 360 (S920).

In addition, the second control unit 350 extracts a second password from the second storage unit 360 (S930).

Subsequently, the second control unit 350 controls the second transmission/reception unit 310 to transmit a second pairing message including the unique address of the DTV 300 and the second password to the STB 200 (S940).

Consequently, even when a unique address of a counterpart device is not known, pairing can be performed using the shared addresses and the password. In addition, the unique MAC addresses are exchanged in the pairing operation, so communication using unique MAC addresses of devices is enabled in the following operations.

Figure 10:
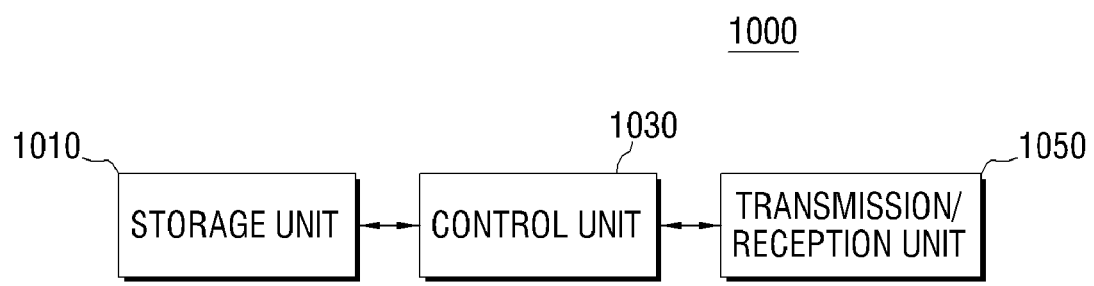
FIG. 10 is a schematic block diagram of a wireless communication apparatus according to an exemplary embodiment of the present invention.

FIG. 10 is a schematic block diagram of a wireless communication apparatus 1000 according to an exemplary embodiment of the present invention. The wireless communication apparatus 1000 enables wireless communication using a unique address, and includes a storage unit 1010, a control unit 1030, and a transmission/reception unit 1050.

The storage unit 1010 stores shared addresses.

The transmission/reception unit 1050 performs pairing with a specific device using the shared addresses.

The control unit 1030 extracts a unique address of the paired specific device, and performs wireless communication using the extracted unique address.

Therefore, communication is enabled using the unique address.

Figure 11:
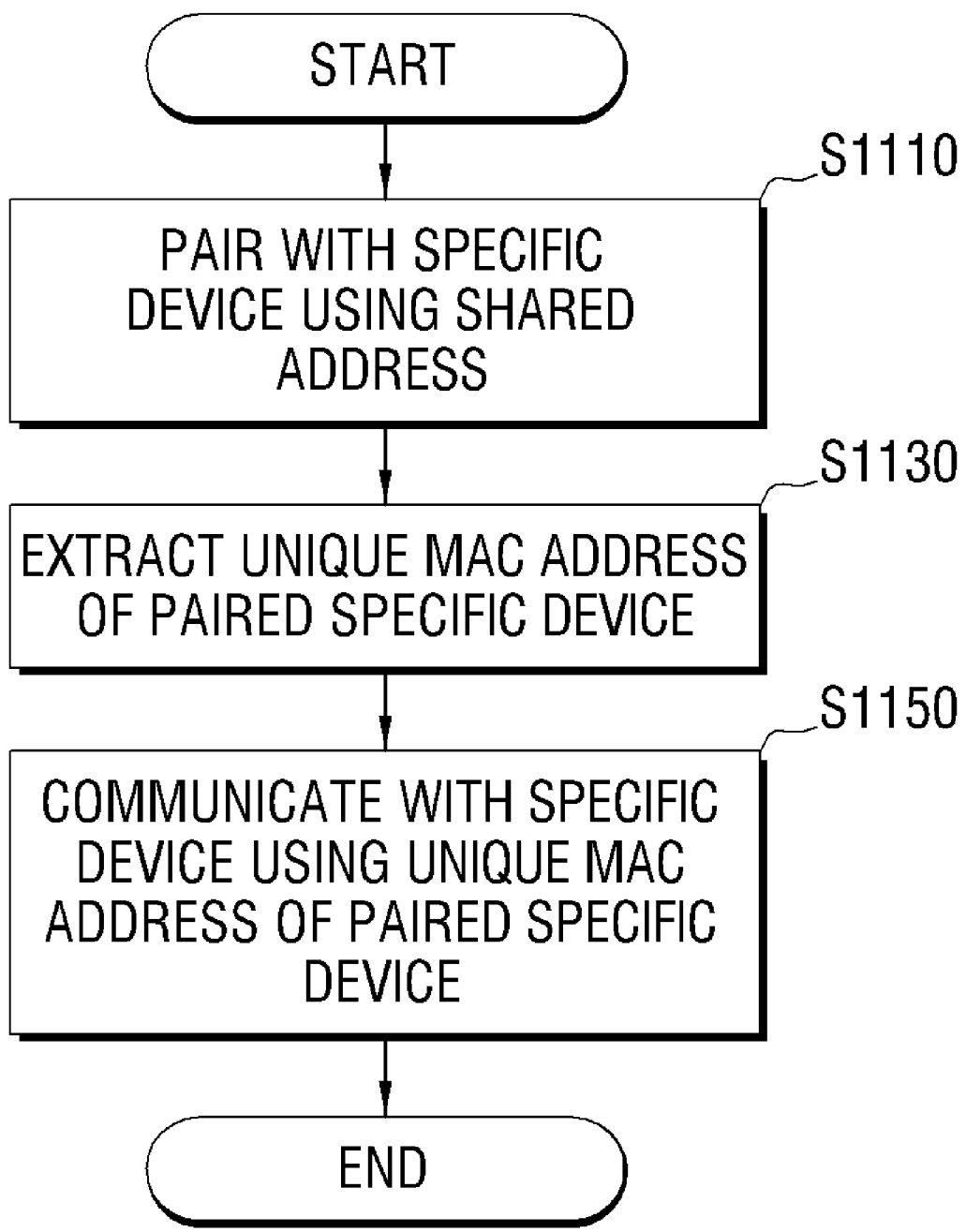
FIG. 11 is a flow chart illustrating a wireless communication method between devices according to an exemplary embodiment of the present invention.

FIG. 11 is a flow chart illustrating a wireless communication method of devices according to an exemplary embodiment of the present invention.

Firstly, pairing with a specific device is performed using shared addresses (S1110). Subsequently, a unique address of the paired specific device is extracted (S1130), and communication with the paired specific device is performed using the unique address of the paired specific device (S1150). Therefore, communication using the unique address is enabled.

Figure 12:
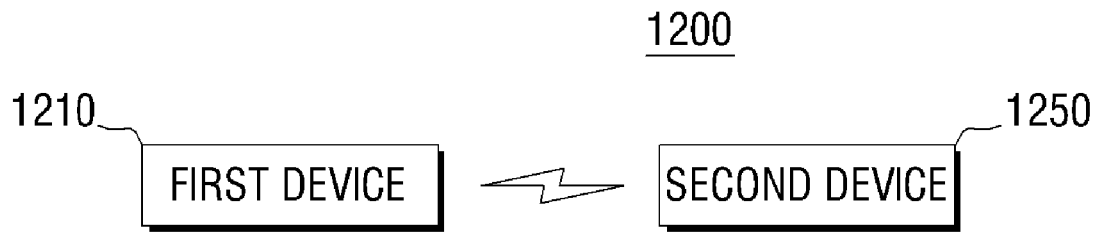
FIG. 12 is a schematic block diagram of a wireless communication system according to an exemplary embodiment of the present invention.

FIG. 12 is a schematic block diagram of a wireless communication system 1200 according to an exemplary embodiment of the present invention. The wireless communication system 1200 enables wireless communication using a unique address, and includes a first device 1210 and a second device 1250.

The first device 1210 transmits pairing request data including a password using shared addresses. The second device 1250 receives the pairing request data, and if the password is the same as its own password, the second device 1250 transmits pairing approval data including the password using the shared addresses.

In addition, the first device 1210 transmits pairing request data and first pairing data using shared addresses. The second device 1250 wirelessly transmits pairing approval data and second pairing data based on information included in the pairing request data and the first pairing data using the shared addresses.

In addition, the first device 1210 performs pairing by transmitting data including a password and first MAC address using shared addresses. The second device 1250 performs pairing by wirelessly transmitting data including a password and second MAC address using the shared addresses.

Therefore, wireless communication between devices is enabled.

In the above exemplary embodiments, since the STB 200 receives a pairing request command from the user, the STB 200 requests pairing and the DTV 300 approves pairing. However, this is merely an example for convenience of description. The technical idea of the present invention can be applied even when the DTV 300 requests pairing to be performed first.

In the above exemplary embodiments, the STB 200 does not need to be limited to transmitting a pairing message and a test message first. For example, even when pairing is completed after the STB 200 transmits a pairing message to the DTV 300 and the DTV 300 transmits a pairing message to the STB 200, the DTV 300 may first transmit a test message to the STB 200.

In the above exemplary embodiments, for communication between the STB 200 and the DTV 300, the STB 200 is paired with the DTV 300, but this is merely an example. The technical idea of the present invention can be applied to all devices capable of wireless communication.

In the above exemplary embodiments, a pairing request message, a pairing approval message, a first pairing message, and a second pairing message are transmitted and received using a first shared message and second shared message. However, as long as the technical idea of using shared addresses is employed, the number of shared addresses need not be limited to two.

For example, if there are three shared addresses, the STB 200 may request pairing by setting a first shared address from among the three shared addresses to be a source address and setting a second shared address to be a destination address.

In this case, since the DTV 300 has the three shared addresses which can be set to be a source address or a destination address, the DTV 300 determines that a destination address set by the STB 200 is its own address, and thus receives a pairing request message transmitted from the STB 200.

The DTV 300 can approve pairing by setting the second shared address from among the three shared addresses to be a source address and setting the first shared address to be a destination address. This logic can be applied even when there are four or more shared addresses as well as when there are three shared addresses.

In addition, such shared addresses can consist of a plurality of sets. For example, the STB 200 may have two sets (A and B) of shared addresses, among which set A may include two shared addresses (a and b) which are used by manufacturer A, and set B may include two shared addresses (c and d) which are used by manufacturer B. In this case, in order to be paired with the DTV 300 manufactured by manufacturer A, the STB 200 uses set A from among the plurality of sets of shared addresses.

The technical idea of the present invention can be applied even when sets of shared addresses are divided according to the taste of the user as well as when sets of shared addresses are divided according to the manufacturer.

Furthermore, the technical idea of the present invention can be applied even when there is only a single shared address. That is, the STB 200 can transmit a pairing request message by setting the single shared address to be a destination address and setting a unique address of the STB 200 to be a source address.

In this case, since the DTV 300 stores the shared address, the DTV 300 determines that the shared address which is set to be a destination address by the STB 200 is an address of the DTV 300 itself, and receives the pairing request message from the STB 200.

Subsequently, the DTV 300 can transmit a pairing approval message by setting the shared address to be a destination address and setting the unique address of the DTV 300 to be a source address. Consequently, pairing is enabled even when a MAC address of a counterpart device is not known.

In the above exemplary embodiments, pairing is performed between two devices, but this is merely an example for convenience of description. The technical idea of the present invention can be applied even when pairing is performed between a single device and a plurality of devices or between a group of a plurality of first devices and a group of a plurality of second devices.

For example, when a single STB 200 is paired with a plurality of DTVs 300, the STB 200 and the plurality of DTVs 300 transmit and receive a pairing request message and a pairing approval message using a first shared address and a second shared addresses.

If pairing is processed, the STB 200 receives a plurality of unique addresses of the plurality of DTVs 300 from the plurality of DTVs 300, and the plurality of DTVs 300 receive a unique address of the STB 200. Therefore, the STB 200 can communicate with the plurality of DTVs 300 using the unique addresses of the STB 200 and the plurality of DTVs 300.

As can be appreciated from the above description, even when a MAC address of a counterpart device is not known, pairing with the counterpart device can be performed without interference with other devices, so communication with the counterpart device is enabled.

The foregoing exemplary embodiments are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A wireless communication method of a device, the method comprising:

pairing the device with a counterpart device by transmitting a unique address of the device to the counterpart device using a shared address and by receiving a unique address of the counterpart device from the counterpart device; and communicating with the counterpart device using at least one of the unique address of the device and the unique address of the counterpart device.

2. The method according to claim 1, wherein the pairing comprises:

transmitting a request for pairing to the counterpart device; and receiving approval for pairing from the counterpart device.

3. The method according to claim 2, wherein in the transmitting the request, pairing with the counterpart device is requested by wirelessly transmitting a message including a password to the counterpart device using the shared address.

4. The method according to claim 1, wherein the pairing comprises:

receiving a request for pairing from the counterpart device; and transmitting approval for pairing to the counterpart device.

5. The method according to claim 4, wherein in the transmitting approval, pairing with the counterpart device is approved by wirelessly transmitting a message including a password to the counterpart device using the shared address.

6. The method according to claim 1, wherein in the pairing, the device is paired with the counterpart device by setting a first shared address selected from a plurality of shared addresses to be an address for transmission and setting a second shared address selected from the plurality of shared addresses to be an address for reception.

7. The method according to claim 1, wherein in the pairing, the device is paired with a plurality of counterpart devices by receiving unique addresses of the plurality of counterpart devices.

8. The method according to claim 1, wherein in the pairing, if pairing is initially performed, the device is paired with the counterpart device by wirelessly transmitting a message including a password input by a user to the counterpart device.

9. The method according to claim 1, wherein in the pairing, if pairing is not initially performed, the device is paired with the counterpart device by wirelessly transmitting a message including a pre-stored password to the counterpart device.

10. A wireless communication apparatus, comprising:
a storage unit which stores a shared address;
a transmission/reception unit which pairs with a counterpart device by transmitting a unique address of the wireless communication apparatus to the counterpart device using a shared address and by receiving a unique address of the counterpart device from the counterpart device; and
a control unit which communicates with the counterpart device using at least one of the unique address of the wireless communication apparatus and the unique address of the counterpart device.

11. The wireless communication apparatus according to claim 10, wherein the transmission/reception unit transmits a request for pairing to the counterpart device, and receives approval for pairing from the counterpart device.

12. The wireless communication apparatus according to claim 11, wherein the transmission/reception unit requests pairing with the counterpart device by wirelessly transmitting a message including a password to the counterpart device using the shared address.

13. The wireless communication apparatus according to claim 10, wherein the transmission/reception unit receives a request for pairing from the counterpart device, and transmits approval for pairing to the counterpart device.

14. The wireless communication apparatus according to claim 13, wherein the transmission/reception unit approves pairing with the counterpart device by wirelessly transmitting a message including a password to the counterpart device using the shared address.

15. The wireless communication apparatus according to claim 10, wherein the transmission/reception unit is paired with the counterpart device by setting a first shared address selected from a plurality of shared addresses to be an address for transmission and setting a second shared selected from the plurality of shared addresses to be an address for reception.

16. The wireless communication apparatus according to claim 10, wherein the transmission/reception unit is paired with plurality of counterpart devices by receiving unique addresses of the plurality of counterpart devices.

17. The wireless communication apparatus according to claim 10, wherein if pairing is initially performed, the transmission/reception unit is paired with the counterpart device by wirelessly transmitting a message including a password input by a user to the counterpart device.

18. The wireless communication apparatus according to claim 10, if pairing is not initially performed, the transmission/reception unit is paired with the counterpart device by wirelessly transmitting a message including a pre-stored password to the counterpart device.

19. A wireless communication system, comprising:
a first device which transmits pairing request data, including a password, using a shared address; and
a second device which receives the transmitted pairing request data, and if the password of the received pairing request data is the same as a stored password, transmits pairing approval data including the password using the shared address.

20. A wireless communication system, comprising:
a first device which wirelessly transmits pairing request data and first pairing data, using a shared address; and
a second device which wirelessly transmits pairing approval data and second pairing data, using the shared address, based on information included in the pairing request data and the first pairing data.

21. A wireless communication system, comprising:
a first device which performs pairing by wirelessly transmitting data, including a password and a first media access control (MAC) address, using a shared address; and
a second device which performs pairing by wirelessly transmitting data including the password and a second MAC address, using the shared address.

* * * * *